UNITED STATES PATENT OFFICE.

LALLAH S. HIGHTON, OF SAN FRANCISCO, CALIFORNIA, ADMINISTRATRIX OF JAMES HOWDEN, DECEASED.

ART OF PURIFYING ALCOHOLIC LIQUORS.

SPECIFICATION forming part of Letters Patent No. 736,098, dated August 11, 1903.

Application filed July 15, 1902. Serial No. 115,694. (No specimens.)

*To all whom it may concern:*

Be it known that I, LALLAH S. HIGHTON, a citizen of the United States, and a resident of the city and county of San Francisco, in the State of California, as administratrix of the estate of JAMES HOWDEN, deceased, do hereby declare that the said JAMES HOWDEN, deceased, was the inventor of a new and useful Improvement in the Art of Purifying Alcoholic Liquors, of which the following is a specification.

This invention is a process by which those poisonous and disagreeably-flavored substances or compounds known as "fusel-oils" are removed in whole or in part from "raw" or "immature" spirituous liquors, either to produce a practically flavorless and in certain cases and to some extent a neutral spirit for laboratory and pharmaceutical uses or to render such liquors more palatable and wholesome when used as beverages, to shorten their time of maturation, and otherwise to enhance their commercial value.

The process which is the subject of this application for patent and embodied and explained therein accomplishes the removal of the objectionable excess of fusel-oils, consisting mainly of the higher alcohols of the fatty series, by providing for their absorption into more or less stable or non-volatile combinations, from which they are not set free in the ordinary method of distillation, (which is to complete the process,) but remain with the distillation residues, as will more fully appear hereinafter.

The chemical process in this improved system of eliminating the offensive associates of raw spirituous liquors is a gradual operation and is wholly at the discretion of the user, so that the chemical action may be instantly arrested at any stage of its progress. By this mode of purification, therefore, any desirable result may be obtained. Although the system facilitates the complete elimination of the fusel-oils when it is desirable to produce what is known as "neutral" spirits, yet it is not intended to wholly supersede the charcoal-filtration process in the production of these flavorless alcohols, but it is particularly adapted to produce the richly aromatic and well-flavored brandies and whiskies and other stimulating fruit and vegetable distillates as medicinally wholesome beverages. It is a fact known to connoisseurs and experts in the production of such beverages that a small quantity of certain aromatic and flavoring elements of the fusel-oils must be present in their natural association with the distillates; otherwise the product is practically valueless as a pleasant healthful stimulating liquor. In this respect, then, the process herein set forth is designed to retain such natural aroma and flavor and to eliminate so far as necessary only those poisonous and otherwise offensive substances that tend to depreciate the intrinsic and commercial value of such liquors; so that it will supply an efficient and reliable means of furnishing aromatic liquors as stimulating beverages as well as for medicinal uses. The process is facilitated by heating or brooding, as will be explained later.

This process is essentially an acid one. The chemical or fusel-oil absorbents employed in carrying it out are the fixed polybasic acids, of which sulfuric, phosphoric, oxalic, tartaric, and boric acids are examples, being such as contain two or more atoms of hydrogen replaceable by alcohol radicals or "alkyls" and are capable of forming by partial replacement acid compounds known as "alkyl acids." For example, from sulfuric acid and amyl alcohol

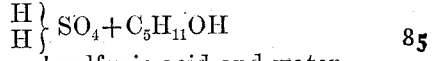

are formed amyl-sulfuric acid and water,

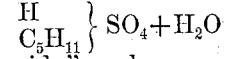

By "fixed acids" are here meant such acids as do not volatilize below the boiling-point of water. Of the fixed polybasic acids cheaply obtainable in commerce sulfuric acid (bibasic) is the most available and has been found the best for most purposes. According to tests made oxalic, phosphoric, and tartaric acids are likewise efficient for the same purpose, but with certain differences in the results, as may readily be anticipated. In certain cases and for special results other acids of this class will be found available. As before intimated, this process of purification, or the absorption of the fusel-oils by the aforesaid polybasic acids, may be stopped at any stage of its action. This stay of decomposition and transformation is effected by the introduction of an efficient base, such as potash, soda, or lime, (preferably in the form of carbonates,) which base chemically combines with the aforesaid acids to form the more stable corresponding salts. When sulfuric acid and soda are the reagents employed, the action of the soda is to neutralize any free sulfuric acid by the formation of sodic sulfate, and thus stop the action of sulfuric acid, and also to combine with the amyl-sulfuric acid formed to produce sodic amyl-sulfate. Thus from amyl-sulfuric acid and sodic carbonate

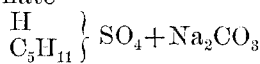

are formed sodic amyl-sulfate and carbonic acid,

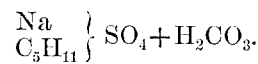

The base acts to arrest further decomposition of said acids even under high temperatures and accordingly facilitates the positive separation of the spirit under treatment by the succeeding distillation without danger of recontamination by the fusel-oils or the added chemicals, with which they are now in stable combination. The amounts of such reagents to be used in each particular case are determined by the character and degree of contamination of the raw liquor to be treated and by the results sought. Even for brandies that are most heavily charged with fusel-oil, such as those distilled directly from pomace, the amount of acid required is quite small. In the case of sulfuric acid and proof spirits it is about one and a half per cent., by measure, and for liquors of higher grade normally from about eight-tenths to one per cent., according to experiments made. For the treatment of high wines a proportionate increase in the amount of acid used is of course necessary. In the case of phosphoric, tartaric, and oxalic acids the dose ascertained for sulfuric acid recalculated upon the molecular weights of these acids will serve as a general guide. It is known that citric and tartaric acid will act similarly to the above in the formation of alkyl acids, but their high cost at the present time precludes their economic use.

The fusel-oils of raw alcoholic liquors comprise three chief classes of compounds—the aldehydes, which take no part in the process herein set forth; the "higher" alcohols of the fatty series, which constitute the bulk of the fusel-oils, and the more complex and volatile "esters." These esters contain the alkyl radicals in combination with some of the fatty-acid series, and being already neutral acid compounds are the last to be affected by the herein-described process. In fact, it is one of the objects of the invention to retain these esters or a sufficiency thereof in the product, since they constitute the delicate and appreciated flavors of distilled beverages. Although, as just explained, the esters are not readily attacked by the fixed polybasic acids, as is the case with the free "fusel" alcohols, yet they are ultimately broken up by prolonged treatment and transformed into alkyl acids and free organic acids when it is intended to produce a so-called neutral spirit. Of these desirable flavoring-esters the important ones comprised under the name of œnanthic, the main principles of "cognac essence," are among the last to disappear under the treatment. It is therefore quite clear that by this process one can get any desired result, from that of nearly neutral spirit to that of the most highly-flavored liquors.

The alkyl acids are readily formed in the strong ninety-five per cent. alcohols by the agency of the fixed polybasic acids, with or without heating; but the inventor of this process has further discovered by experiment that the alkyl acids containing the higher alcohols can also be formed in "proof" or weak spirits under this treatment by heating the mixture for a more or less extended period, preferably by steam, in glass vessels (carboys) or lead-lined tanks, to temperatures ranging from 120° to 170° Fahrenheit. The heating of the mixture, as already inferred, is herein called "brooding," and is continued until the desired result is obtained. The brooding usually requires from less than one week to three weeks, according to the proportionate amount of the acid employed and the nature and coarseness of the raw liquor being operated upon. During this period the progress of the absorption of the fusel-oils can readily be tested by the distillation and tasting of small samples. In carrying on the brooding care should be exercised not to have the carboys or tanks entirely full nor too tightly stoppered, (but only enough to prevent material loss from evaporation.) When the distillation test shows that the desired flavor or degree of deodorization (or dephlegmation) is attained, the liquor is allowed to cool or is run off through leaden pipes immersed in cold water. The further action of the acid is then arrested by the admixture of a proper quantity of the carbonate of soda, potash, lime, or other suitable base, as provided for above, and the alkyl acid or acids are thus neutralized. The carbonate of lime, if used, should be free from magnesia. The alkyl acids, as before seen, are converted by this neutralization or reaction of the base into neutral salts, as indicated by the formula already given, which salts are sufficiently stable to resist any tendency to let the higher alcohols volatilize during the distillation that follows, such salts remaining with the residue after distillation when stopped at the point when ethyl alcohol ceases to come off. The amount of base added should be a little in excess of enough to neutralize the acid, such excess of the base acting to prevent any tendency to decomposition of the alkyl-acid salts during the distillation. The liquor is next distilled, with the customary precautions, preferably in a still of the Derosne type. Should the last run be unsatisfactory in flavor, it may be re-treated with a subsequent batch or used for other purposes. The distillate is then made into the finished brandy or other liquor by the usual methods and in a much shorter space than would otherwise have been required. The commercial components of the residue may be afterward extracted when so desired by known means— e. g., distillation with excess of sulfuric or other acid.

By "raw" and "immature" liquor in this specification is meant, first, the spirit as it runs from the condenser of the still after the first fraction containing the aldehydes has been rejected, and, secondly, liquor that has not lost by the usual process of aging in wooden casks the harshness characteristic of new spirits or acquired the mellowness of old liquor.

To give a particular instance of successful treatment by the process described, the following will serve as an illustration: Seven liters of raw whisky were placed in a demijohn, to which was added seventy cubic centimeters of sulfuric acid of density 1.84, which latter was poured into the liquor in a thin stream while slightly agitating the liquor. The demijohn being then immersed in a water-bath, the temperature was raised to and maintained at 160° Fahrenheit for four days. A test distillation of one hundred cubic centimeters in a glass flask after previous neutralization with sal-soda proved that the liquor still retained some of the raw flavor. The brooding was therefore continued for two days more, when the tasting test showed that a satisfactory flavor had been attained. The charge was then neutralized with sal-soda and distilled. A portion of the same batch was, however, re-treated with one per cent. of sulfuric acid for five days more. After neutralization and distillation this was found to be still further improved, and the acid-vapors arising from the acidified watery residue proved that some of the residue esters had been decomposed with the formation of alkyl-sulfuric acid and free organic acid. It was judged, however, that for most palates a week's treatment of this whisky would be the proper gage.

What is claimed, and desired to be secured by Letters Patent of the United States, is—

1. The herein-described process of purifying alcoholic liquors, which comprises the following steps: placing in the liquor a "fixed" polybasic acid, of the kind described, allowing said acid to be converted into alkyl acid by the aid of heat, neutralizing said alkyl acid by a suitable base and distilling the neutralized liquor, substantially as set forth.

2. The herein-described process of purifying alcoholic liquors, which consists in causing the excess of fusel-oil to be absorbed by a fixed polybasic acid placed in the liquor, brooding the mixture for a suitable time, then neutralizing the alkyl acid by an efficient base, and distilling, substantially as described.

3. The herein-described process of purifying raw or immature alcoholic liquors, consisting, first, in putting into the liquor a fixed acid having two or more atoms of hydrogen replaceable by alkyls; secondly, in brooding the liquor for a suitable time with the said fixed acid and thereby causing the formation of alkyl acids; thirdly, cooling the brood; fourthly neutralizing the alkyl acids by converting them into alkyl-acid salts through the agency of a base; and lastly, in distilling the mixture.

4. The herein-described process of purifying raw or immature distilled liquors, comprising the following steps; adding to the liquor a fixed polybasic acid, of the kind described, to form an alkyl acid, brooding the same, mixing with the brood a basic neutralizer, to neutralize the alkyl-acid formation; and subjecting the liquor, after neutralization, to further distillation, substantially as hereinbefore described.

5. The herein-described process of purifying alcoholic liquors, which consists in mixing with the raw or immature liquor a small percentage of a "fixed" polybasic acid and brooding the mixture whereby the objectionable higher alcohols of the fusel-oils are made to replace some of the hydrogen elements of the polybasic acid and to form alkyl acids, the flavoring-esters being only slightly affected; then neutralizing the alkyl acids (holding the objectionable fusel-oil elements) to fix or render them less decomposable, and also to arrest the action of the polybasic acids on the volatile flavoring-esters, and finally distilling the mixture to separate a purified liquor containing the desirable volatile flavoring-esters from the objectionable and now relatively fixed fusel-oil compounds which remain undistilled, substantially as described.

In testimony whereof I have signed my name to this specification in the presence of two subscribing witnesses.

LALLAH S. HIGHTON,
*Administratrix of the estate of James Howden, deceased.*

Witnesses:
A. H. STE. MARIE,
J. EMMETT WALSH.